(12) United States Patent
Frid

(10) Patent No.: US 9,692,730 B2
(45) Date of Patent: Jun. 27, 2017

(54) SYSTEM AND METHOD FOR DECODING TRAFFIC OVER PROXY SERVERS

(75) Inventor: Naomi Frid, Modi'in (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 418 days.

(21) Appl. No.: 13/358,476

(22) Filed: Jan. 25, 2012

(65) Prior Publication Data

US 2012/0215927 A1 Aug. 23, 2012

(30) Foreign Application Priority Data

Jan. 27, 2011 (IL) .......................................... 210899

(51) Int. Cl.
*G06F 15/16* (2006.01)
*H04L 29/06* (2006.01)

(52) U.S. Cl.
CPC ...... *H04L 63/0407* (2013.01); *H04L 63/0281* (2013.01); *H04L 63/30* (2013.01); *H04L 63/306* (2013.01)

(58) Field of Classification Search
None
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,738,808 B1 | 5/2004 | Zellner et al. | |
| 6,757,361 B2 | 6/2004 | Blair et al. | |
| 6,875,009 B2* | 4/2005 | Kayahara ................. | F23C 9/08 431/115 |
| 7,020,700 B1* | 3/2006 | Bennett et al. ............... | 709/224 |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 8,204,082 B2* | 6/2012 | Jungck et al. ................ | 370/498 |
| 2003/0014624 A1* | 1/2003 | Maturana et al. ............ | 713/151 |
| 2003/0217144 A1* | 11/2003 | Fu et al. ....................... | 709/224 |

(Continued)

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Philip Chea
*Assistant Examiner* — Van Kim T Nguyen
(74) *Attorney, Agent, or Firm* — Meunier Carlin & Curfman

(57) ABSTRACT

Methods and systems for applying surveillance to client computers that communicate via proxy servers. A decoding system accepts communication packets from a communication network. Based on the received packets, the decoding system identifies that a certain client computer conducts a communication session with a target server via a proxy server. The decoding system processes the packets so as to correlate the identity of the client computer with the identity of the target server. The correlated identities may comprise, for example, Internet Protocol (IP) addresses or Uniform Resource Locators (URLs).

10 Claims, 1 Drawing Sheet

(56) References Cited

U.S. PATENT DOCUMENTS

| | | | |
|---|---|---|---|
| 2003/0235206 A1* | 12/2003 | Heller | 370/467 |
| 2005/0002406 A1* | 1/2005 | Miyata et al. | 370/401 |
| 2006/0029038 A1* | 2/2006 | Jungck | 370/351 |
| 2006/0056317 A1* | 3/2006 | Manning et al. | 370/254 |
| 2007/0037585 A1* | 2/2007 | Shim | 455/456.1 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2013/0117460 A1* | 5/2013 | Hsu et al. | 709/228 |
| 2013/0212689 A1* | 8/2013 | Ben-Natan et al. | 726/26 |

OTHER PUBLICATIONS

Rohde & Schwarz GmbH & Co. KG, "Accessnet-T, DMX-500 R2, Digital Mobile eXchange," Product Brochure, Secure Communications, Mar. 2000, 4 pages.

Rohde & Schwarz GmbH & Co. KG, "Accessnet-T IP," Product Brochure, Secure Communications, Jan. 2000, 4 pages.

Rohde & Schwarz GmbH & Co. Kg, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S Ramon COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

Extended European search report, dated May 7, 2012, received from the European Patent Office in connection with corresponding European patent application No. 12152447.

Chen, Shiping, et al., "On the Anonymity and Traceability of Peer-to-Peer VoIP Calls," IEEE Network, IEEE Service Center, New York, NY, vol. 20, No. 5, Sep. 1, 2006, pp. 32-37.

* cited by examiner

SYSTEM AND METHOD FOR DECODING TRAFFIC OVER PROXY SERVERS

FIELD OF THE DISCLOSURE

The present disclosure relates generally to computer networks, and particularly to methods and systems for decoding network traffic exchanged over proxy servers.

BACKGROUND OF THE DISCLOSURE

Client computers in computer networks sometimes access servers via intermediary proxy servers. Examples of proxy servers are Hyper-Text Transfer Protocol (HTTP) proxy servers, also referred to as Web proxy servers, and SOCKS proxy servers. Proxy servers may be employed for a variety of reasons, such as for hiding ("anonymizing") the identity of the client, for communicating behind firewalls, or for improving network performance.

SUMMARY OF THE DISCLOSURE

An embodiment that is described herein provides a method including receiving communication packets from a communication network and identifying, based on the received communication packets, that a client computer conducts a communication session with a target server via a proxy server. A first identity of the client computer is correlated with a second identity of the target server by processing the communication packets.

In some embodiments, an indication of the second identity is encoded in one or more of the communication packets that are exchanged between the client computer and the proxy server, and correlating the first identity with the second identity includes decoding the indication. In an embodiment, the client computer communicates with the proxy server over a first Transmission Control Protocol (TCP) tunnel, the proxy server communicates with the target server over a second TCP tunnel, and correlating the first identity with the second identity includes decoding at least one of the first and second TCP tunnels.

In a disclosed embodiment, the proxy server includes a Hyper-Text Transfer Protocol (HTTP) proxy server. In another embodiment, the proxy server operates in accordance with a SOCKS protocol. In yet another embodiment, the method includes reconstructing and presenting the communication session, as viewed at the client computer, using the correlated first and second identities. Reconstructing and presenting the communication session may include modifying at least some of the received communication packets to imitate a modified session between the client computer and the target server that does not traverse the proxy server, reconstructing the modified session from the modified communication packets and presenting the modified communication session.

There is additionally provided, in accordance with an embodiment that is described herein, apparatus including a network interface and a processor. The network interface is configured to receive communication packets from a communication network. The processor is configured to identify, based on the received communication packets, that a client computer conducts a communication session with a target server via a proxy server, and to correlate a first identity of the client computer with a second identity of the target server by processing the communication packets.

The present disclosure will be more fully understood from the following detailed description of the embodiments thereof, taken together with the drawings in which:

DETAILED DESCRIPTION OF EMBODIMENTS

Overview

Figure 1:
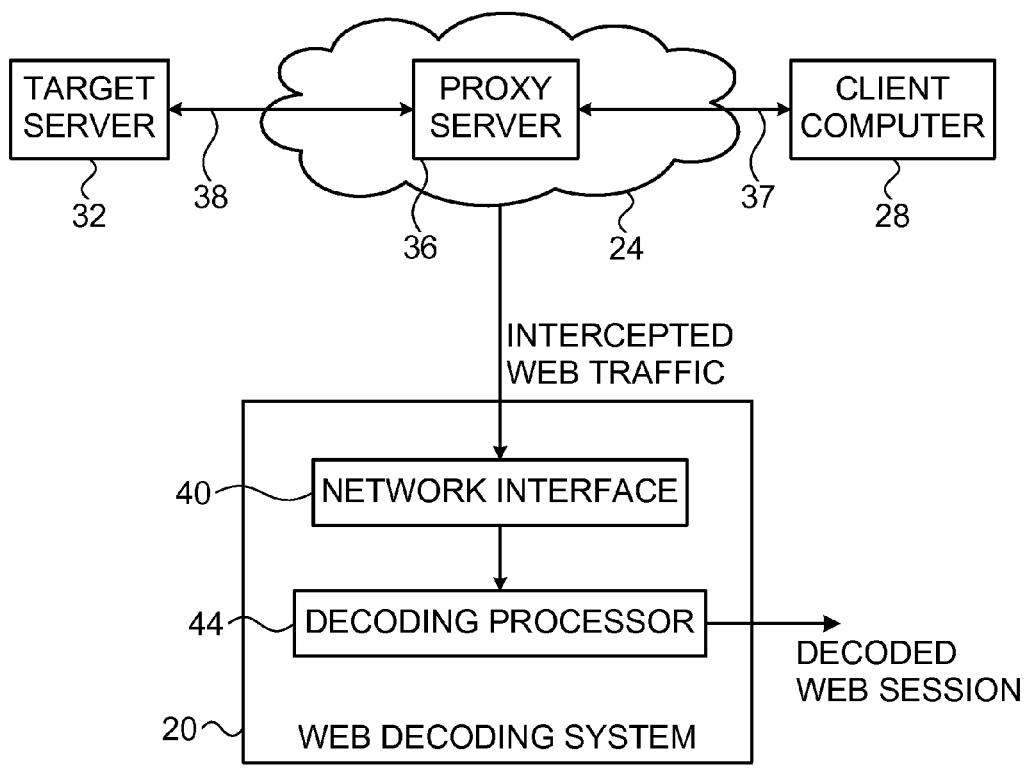
FIG. 1 is a block diagram that schematically illustrates a web decoding system, in accordance with an embodiment of the present disclosure.

Client computers in computer networks sometimes access servers (e.g., Web-sites) via proxy servers. In some cases, a proxy server may be used innocently, e.g., for improving network performance. In other cases, a client computer may use a proxy server for illegitimate purposes, e.g., in order to conceal his or her identity from the server or to access servers that are blocked for access. In either case, communication via proxy servers makes it difficult to correlate the identity of the client computer with the identity of the server, and therefore presents a challenge for interception and surveillance applications.

Embodiments that are described herein provide methods and systems for applying surveillance to client computers that communicate via proxy servers. In the context of the present patent application and in the claims, the term "proxy server" refers to any type of server via which a client computer communicates with a target server and which de-correlates the identity of the client computer from the identity of the target server.

Typically, de-correlation means that a packet that is sent or received by the proxy server may contain the identity of the client computer or the identity of the target server, but not both, at least not in explicit form. When communicating via a SOCKS proxy, for example, the true destination address is sent in the packet payload, and is not the IP destination address that appears in the packet header. In addition to various types of proxy servers such as Web-proxy servers and SOCKS proxy servers, the disclosed techniques can be used with other types of intermediary servers such as compression servers.

In some embodiments, a decoding system accepts communication packets from a communication network. Based on the received packets, the decoding system identifies that a certain client computer conducts a communication session with a target server via a proxy server. The decoding system processes the packets so as to correlate the identity of the client computer with the identity of the target server. The correlated identities may comprise, for example, Internet Protocol (IP) addresses or Uniform Resource Locators (URLs).

The decoding system may use various methods for correlating the identity of the client computer with that of the target server, even though both identities are not explicitly given in the same packet. For example, in some communication protocols the identity of the target server is inserted, in encoded or obfuscated form, into request packets that are sent from the client computer to the proxy server. In some embodiments, the decoding system decodes the request packets and thus detects that the client computer communicates with the target server.

In some embodiments, the decoding system reconstructs the communication session between the client computer and the target server, as viewed by the user of the client computer. The reconstructed session can be presented to an operator. In an example embodiment, the decoding system pre-processes the packets so as to create an artificial session, which is conducted directly between the client computer and the target server and does not pass through the proxy server. The artificial session is then decoded and presented to the operator.

The methods and systems described herein are highly effective in performing surveillance on client computers that communicate via proxy servers, and in particular for decoding and reconstructing communication sessions conducted via proxy servers. As such, the disclosed techniques enhance the surveillance capabilities of Government and law enforcement agencies.

System Description

FIG. 1 is a block diagram that schematically illustrates a web decoding system 20, in accordance with an embodiment of the present disclosure. System 20 accepts communication packets from a communication network 24 in order to apply surveillance operations to network users. In the present example, system 20 decodes, reconstructs and presents communication sessions that are conducted between client computers 28 and target servers 32 via proxy servers 36. Alternatively, however, the disclosed techniques can be used to perform any other suitable surveillance operation. Systems of this sort may be operated, for example, by law enforcement, homeland security or other Government agency. System 20 may connect to network 24 and receive the packets using any suitable interface, such as using passive probing or packet mirroring.

Network 24 may comprise, for example, the Internet, an intranet of a certain organization, or any other suitable network. Client computers 32 may comprise, for example, personal, mobile or notebook computers, mobile communication terminals such as cellular phones or Personal Digital Assistants (PDAs), or any other suitable computing platform having communication capabilities. Client computers 32 may connect to network 24 using any suitable wireless or wire-line means.

System 20 comprises a network interface 40 for connecting to network 24, and a decoding processor 44 that carries out the methods described herein. In a typical embodiment, processor 44 accepts communication packets from network 24 via interface 40. Based on the received packets, the decoding processor identifies that a certain client computer 28 conducts a communication session with a certain target server 32 via a proxy server 36. By processing the packets, the decoding processor then correlates the identity of the client computer with the identity of the target computer, in spite of the fact that communication is carried out via the proxy server. Several examples of techniques that correlate the identities of client computers and target servers are described in greater detail below. In an embodiment, decoding processor 44 reconstructs the communication session, i.e., attempts to recreate the user interface that is viewed by the user of the client computer. The reconstructed session is presented to an operator of system 20.

The system configuration shown in FIG. 1 is chosen purely for the sake of conceptual clarity. In alternative embodiments, any other suitable system configuration can also be used. Although FIG. 1 shows only a single client computer, a single target server and a single proxy server for the sake of clarity, real-life networks often comprise multiple client computers, target servers and proxy servers. Typically, system 20 processes packets pertaining to multiple communication sessions simultaneously.

The elements of system 20 can be implemented in hardware, such as using one or more Application-Specific Integrated Circuits (ASICs) or Field Programmable Gate Arrays (FPGAs). Alternatively, some elements of system 20 may be implemented in software, or using a combination of hardware and software elements. In some embodiments, decoding processor 44 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Reconstructing Communication Sessions Conducted Via Proxy Servers

Consider a certain client computer 28 that conducts a communication session with a certain target server 32 via a certain proxy server 36. The client computer may choose to communicate via the proxy server for any reason, for example in order to hide his or her identity. As another example, the client computer's network may have restricted access to the target server, and the client computer uses the proxy server to work around this restriction.

In some embodiments, target server 32 comprises a Web server and proxy server 36 comprises a Hyper-Text Transfer Protocol (HTTP) server, also referred to as a Web-proxy server. In these embodiments, client computer 28 typically operates a browser application that attempts to access Web pages on target server 32. Instead of communicating with the target server directly, the browser of the client computer communicates with proxy server 36. The client computer's browser sends to the proxy server HTTP request messages that notify the proxy server of the requested Web pages. The proxy server communicates with the target server and relays the requested Web pages to the client computer.

In alternative embodiments, proxy server 36 comprises a SOCKS proxy server, which operates in accordance with the SOCKS protocol. The SOCKS protocol is described, for example, by Leech et al., in Request For Comments (RFC) 1928 of the Internet Engineering Task Force (IETF), entitled "SOCKS Protocol Version 5," March, 1996, which is incorporated herein by reference. In a SOCKS proxy server, the client computer provides the proxy server with the details of a connection that is to be set up with a target server. The proxy server then establishes two back-to-back connections—one with the client computer and the other with the target server.

Regardless of the type of proxy server, the communication session typically involves establishing two back-to-back connections: A client-proxy connection 37 between the client computer and the proxy server, and a proxy-target connection 38 between the proxy server and the target server. The specific protocols used over these connections may vary from one type of proxy server to another. Connections 37 and 38 may comprise, for example, Transfer Control Protocol (TCP) streams, IP tunnels or any other suitable connection type.

Typically, any packet that is exchanged over connection 37 or 38 may indicate the identity of the client computer or of the target server, but not both, at least not in explicit form. The correlation between the two identities is known to the proxy server, but not to the target server. In some embodiments, decoding processor 44 processes the packets that are exchanged over at least one of connection 37 and connection 38, in order to correlate the identity of the client computer with the identity of the target server.

In some embodiments, when proxy server 36 comprises an HTTP proxy server, the HTTP request packets that are sent over connection 37 from client computer 28 to proxy server 36 contain the URL of the target server in encoded (obfuscated) form. In an embodiment, decoding processor 44 decodes at least one of the HTTP request packets, so as to extract the URL of the target server. The decoding processor then correlates the extracted URL of the target server with the identity (e.g., IP address) of the client computer that is indicated in the HTTP request packets.

Figure 2:
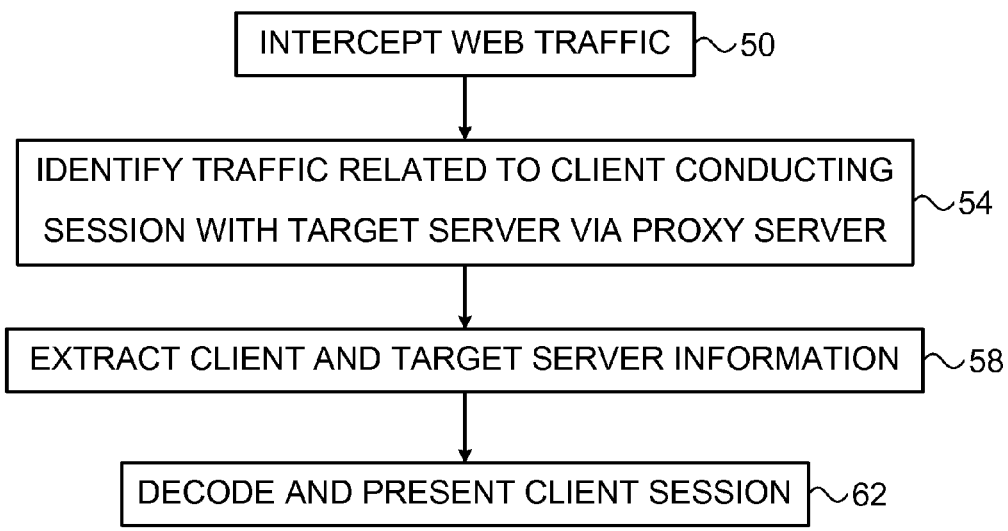
FIG. 2 is a flow chart that schematically illustrates a method for decoding network traffic that is exchanged over a proxy server, in accordance with an embodiment of the present disclosure.

FIG. 2 is a flow chart that schematically illustrates a method for decoding network traffic that is exchanged over proxy server 36, in accordance with an embodiment of the present disclosure. The method begins with decoding system 20 receiving (e.g., intercepting) Web traffic from network 24, at an input step 50. The Web traffic typically comprises multiple communication packets that are exchanged over the network.

Decoding processor 44 identifies some of the packets as belonging to a communication session that is conducted between client computer 28 and target server 32 over proxy server 36. The identified packets may belong to client-proxy connection 37, to proxy-target connection 38, or both. Decoding processor 44 extracts and correlates the identity of the client computer and the identity of the target server by processing the identified packets, at a correlation step 58.

Using the correlated identities of the client computer and the target server, processor 44 reconstructs the communication session, as seen by the user of the client computer, at a session decoding step 62. The reconstructed session is presented to an operator of system 20, e.g., on a display or other suitable output device.

Pre-Processing of Proxy Sessions

In some embodiments, processor 44 decodes and reconstructs sessions over proxy servers in a two-stage process. In the first stage, processor 44 pre-processes the packets that belong to sessions that are conducted over proxy servers. The pre-processing operation modifies the packets to represent an artificial direct session between the client computer and the target server, which does not pass through the proxy server. In the second stage, processor 44 decodes the modified packets, so as to reconstruct the artificial direct session, and presents the reconstructed session to the operator.

The disclosed technique is useful, for example, when decoding system 20 comprises existing software (or hardware) for decoding, reconstructing and presenting direct sessions that do not use proxy servers. The two-stage process described above enables adding the capability of decoding proxy sessions to such a decoding system.

In some embodiments, the pre-processing operation involves classifying the incoming packets to packets that belong to proxy sessions and packets that belong to non-proxy sessions. Packets belonging to non-proxy sessions are decoded as-is and the sessions presented to the operator. Packets belonging to proxy sessions are pre-processed as explained above, and then looped back to the classifying operation. Since the pre-processing modifies the packets to appear as a direct session, the looped-back packets will be classified as belonging to non-proxy sessions and provided for decoding. The two-stage configuration described above is shown purely by way of example. In alternative embodiments, any other suitable configuration can be used.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
receiving communication packets from a communication network;
identifying at least some of the communication packets as belonging to a communication session that is conducted between a client computer and a target server via a proxy server;
modifying at least some of the identified communication packets to represent an artificial direct session between the client computer and the target server, which does not traverse the proxy server;
decoding the modified packets so as to reconstruct the artificial direct session; and
presenting the reconstructed artificial direct session to a surveillance operator.

2. The method according to claim 1, further comprising correlating a first identity of the client computer with a second identity of the target server, wherein an indication of the second identity is encoded in one or more of the communication packets that are exchanged between the client computer and the proxy server, and wherein correlating the first identity with the second identity comprises decoding the indication.

3. The method according to claim 1, further comprising correlating a first identity of the client computer with a second identity of the target server, wherein the client computer communicates with the proxy server over a first Transmission Control Protocol (TCP) tunnel, wherein the proxy server communicates with the target server over a second TCP tunnel, and wherein correlating the first identity with the second identity comprises decoding at least one of the first and second TCP tunnels.

4. The method according to claim 1, wherein the proxy server comprises a Hyper-Text Transfer Protocol (HTTP) proxy server.

5. The method according to claim 1, wherein the proxy server operates in accordance with a SOCKS protocol.

6. Apparatus, comprising:
a network interface, which is configured to receive communication packets from a communication network; and
a hardware processor, which is configured to identify at least some of the communication packets as belonging to a communication session that is conducted between a client computer and a target server via a proxy server, wherein the processor is configured to modify at least some of the identified communication packets to represent an artificial direct session between the client computer and the target server, which does not traverse the proxy server, to decode the modified packets so as to reconstruct the artificial session, and to present the reconstructed artificial direct session to a surveillance operator.

7. The apparatus according to claim 6, wherein the processor is further configured to correlate a first identity of the client computer with a second identity of the target server, wherein an indication of the second identity is encoded in one or more of the communication packets that are exchanged between the client computer and the proxy server, and wherein the processor is configured to correlate the first identity with the second identity by decoding the indication.

8. The apparatus according to claim 6, wherein the processor is further configured to correlate a first identity of the client computer with a second identity of the target server, wherein the client computer communicates with the proxy server over a first Transmission Control Protocol (TCP) tunnel, wherein the proxy server communicates with the target server over a second TCP tunnel, and wherein the processor is configured to correlate the first identity with the second identity by decoding at least one of the first and second TCP tunnels.

9. The apparatus according to claim 6, wherein the proxy server comprises a Hyper-Text Transfer Protocol (HTTP) proxy server.

10. The apparatus according to claim 6, wherein the proxy server operates in accordance with a SOCKS protocol.

* * * * *